(12) United States Patent
Kretzschmann et al.

(10) Patent No.: US 8,511,942 B2
(45) Date of Patent: Aug. 20, 2013

(54) MACHINE TOOL WITH ADJUSTABLE CUTTING INSERT

(75) Inventors: Uwe Kretzschmann, Besigheim (DE); Benno Spors, Marbach (DE); Erkan Hodza, Asperg (DE)

(73) Assignee: Komet Group GmbH, Besigheim (DE)

( * ) Notice: Subject to any disclaimer, the term of this patent is extended or adjusted under 35 U.S.C. 154(b) by 317 days.

(21) Appl. No.: 12/737,561

(22) PCT Filed: Aug. 20, 2009

(86) PCT No.: PCT/EP2009/060783
§ 371 (c)(1),
(2), (4) Date: Jan. 25, 2011

(87) PCT Pub. No.: WO2010/026056
PCT Pub. Date: Mar. 11, 2010

(65) Prior Publication Data
US 2011/0123281 A1 May 26, 2011

(30) Foreign Application Priority Data

Sep. 4, 2008 (DE) .................. 10 2008 045 674

(51) Int. Cl.
*B23C 5/24* (2006.01)
(52) U.S. Cl.
CPC .................... *B23C 5/24* (2013.01)
USPC .................. 407/36; 407/44; 407/46
(58) Field of Classification Search
USPC ............. 407/36, 37, 38, 39, 44, 45, 46, 48; 408/153, 161, 168

IPC ......................................... B23C 5/24
See application file for complete search history.

(56) References Cited

U.S. PATENT DOCUMENTS

| 3,189,976 | A | * | 6/1965 | Pickril ............................ 407/80 |
| 3,839,772 | A | * | 10/1974 | Shimomura et al. ............ 407/36 |
| 4,318,647 | A | * | 3/1982 | Erkfritz ......................... 408/153 |
| 4,848,977 | A |   | 7/1989 | Kieninger |
| 5,120,166 | A |   | 6/1992 | Woerner |

(Continued)

FOREIGN PATENT DOCUMENTS

DE  2 112 689      9/1972
DE  39 24 688 A1   1/1991

(Continued)

OTHER PUBLICATIONS

Search Report of German Patent Office dated Mar. 26, 2009 (4 pages) with English translation of p. 2.

(Continued)

*Primary Examiner* — Daniel Howell
*Assistant Examiner* — Alan Snyder
(74) *Attorney, Agent, or Firm* — Flynn, Thiel, Boutell & Tanis, P.C.

(57) ABSTRACT

A rotating machine tool has a base with a rotating axis, at least one pocket formed in the base and at least one blade support holding a cutting plate. Two side surfaces of the blade support sit against a side support surface, respectively, the blade support side surfaces making an angle between them, and the base of the blade support sits against a base support surface of the pocket, the blade support being clamped in the pocket removably by way of a clamp element. The cutting plate protrudes over the blade support with an effective blade and over the base outward.

12 Claims, 12 Drawing Sheets

(56) References Cited

U.S. PATENT DOCUMENTS

| | | | |
|---|---|---|---|
| 5,209,610 A * | 5/1993 | Arai et al. | 407/36 |
| 5,967,705 A | 10/1999 | Wermeister | |
| 6,152,658 A * | 11/2000 | Satran et al. | 407/103 |
| 6,695,548 B2 | 2/2004 | Focken et al. | |
| 7,014,393 B2 | 3/2006 | Matheis | |
| 7,080,963 B2 | 7/2006 | Schaupp et al. | |
| 2001/0051075 A1 | 12/2001 | Focken et al. | |
| 2003/0202848 A1 * | 10/2003 | Gamble et al. | 407/36 |
| 2005/0047876 A1 | 3/2005 | Schaupp et al. | |

FOREIGN PATENT DOCUMENTS

| | | |
|---|---|---|
| DE | 39 22 963 C2 | 4/1991 |
| DE | 44 30 197 A1 | 3/1996 |
| DE | 196 01 666 A1 | 7/1997 |
| DE | 101 08 103 A1 | 8/2002 |
| DE | 103 40 493 B4 | 4/2005 |
| DE | 10 2006 036 765 A1 | 2/2008 |
| EP | 0 282 090 A1 | 9/1988 |
| EP | 1 136 162 A1 | 9/2001 |
| WO | WO 96/08334 | 3/1996 |

OTHER PUBLICATIONS

Form PCT/ISA1237 dated Oct. 16, 2009 (8 pages).

Form PCT/ISA/210 dated Oct. 16, 2009 (4 pages) with English translation of categories of documents cited.

* cited by examiner

MACHINE TOOL WITH ADJUSTABLE CUTTING INSERT

BACKGROUND OF THE INVENTION

The invention relates to a machine tool with a base member having an axis of rotation, with at least one pocket formed in the base member and with at least one cutter carrier carrying a cutting insert, wherein the cutter carrier lies with two side surfaces, enclosing an angle with one another, against a respective side supporting surface and with its bottom against a bottom supporting surface of the pocket and is releasably clamped in the pocket by a clamping element, and wherein the cutting insert protrudes with an effective cutting edge freely in the outward direction beyond the cutter carrier and the base member.

The pocket, forming a seat for the cutter carrier, ensures that the cutter carrier, and with it the cutting insert, is determined in its position within the base member. With a given geometry of the cutter carrier and the cutting insert, the position of the pockets in the base member determines the cutting radius. To allow compensation for production tolerances, it is already known to arrange the cutting insert adjustably in the base member. For this purpose, the cutter carrier is arranged adjustably with respect to the base member.

Furthermore, in the case of a machine tool in which the cutting insert is supported directly, that is without a cutter carrier, in an insert seat with two edge supporting surfaces and a bottom supporting surface, it is known per se (DE-A-10 108 103) that one of the two edge supporting surfaces is formed as a wedge surface, which is arranged on an adjusting member that is displaceable with respect to the base member along an axis of displacement and encloses an acute angle with the axis of displacement and against which the cutting insert lies with its insert edge opposite from the effective cutting edge and aligned parallel to the wedge surface, and that the other edge supporting surface is aligned perpendicularly in relation to the axis of displacement of the adjusting member, wherein the axis of displacement of the adjusting member is aligned parallel to the bottom supporting surface of the associated insert seat. To adjust the cutting insert, there the head screw on the cutting insert is loosened a little. As soon as the correct drilling diameter is set, the head screw is tightened again. In this case, the adjusting member on the base member is also fixed. The known adjusting device is suitable only for adjusting cutting inserts aligned radially on the base member. The adjustment always takes place perpendicularly in relation to the fixing screw of the cutting insert in the base member, which has to be loosened slightly for the purpose of adjustment. The adjustment of tangential cutting inserts parallel to their fixing screw is not possible with the known adjusting mechanism.

Against this background, the invention addresses the problem of improving a machine tool of the type specified at the beginning to the extent that a fine adjustment of tangential cutting inserts in the base member is also possible.

The features specified in the present invention are proposed to solve this problem. Advantageous refinements and developments of the invention are also provided.

BRIEF DESCRIPTION OF THE INVENTION

The solution according to the invention is based in particular on the idea that the bottom supporting surface for the cutter carrier forms a wedge surface, which is arranged on an adjusting member that is displaceable with respect to the base member along an axis of displacement and encloses an acute angle with the axis of displacement and against which the cutter carrier lies with its bottom formed as a complementing wedge, and that the two side supporting surfaces at the same time form guiding surfaces for the cutter carrier, aligned substantially perpendicularly in relation to the axis of displacement of the adjusting member, during a displacing operation performed by displacement of the adjusting member. The axis of displacement of the adjusting member is in this case expediently aligned parallel to the axis of rotation of the base member.

The basic principle of the invention is therefore that the cutting insert is not adjusted with respect to the base member directly but by way of its cutter carrier. This is necessary to be able to adjust the cutting insert parallel to its fastening direction on the base member. With these measures it is also possible for the cutting insert to be turned or exchanged without further fine adjustment. The latter is possible because the cutting insert is fixed on the cutter carrier and the adjusting operation takes place only by way of the cutter carrier. For its part, the cutter carrier must be fixed three-dimensionally in the pocket of the base member by suitable clamping elements. To achieve this, according to a preferred refinement of the invention it is proposed that, on a third side surface, the cutter carrier forms a wedge surface, which encloses a respective angle with the two side surfaces lying against the side supporting surfaces and with the bottom and against which there lies a complementing wedge of the clamping element that can be displaced in relation to the base member by an adjusting member while exerting a respective force component extending in the direction of the two side supporting surfaces and the bottom supporting surface.

The cutting insert is expediently rigidly connected to the cutter carrier by means of a clamping element, in particular by means of a clamping screw. The cutter carrier may be formed as a cartridge which has an insert seat for a cutting insert formed as an indexable insert. To be able to use the same adjusting mechanism for different machining operations, it is expedient to provide a group of at least two cutter carriers which can be exchanged for one another on the base member and have insert seats for different forms of cutting insert.

A further advantageous refinement of the adjusting mechanism provides that the adjusting member can be displaced in relation to the base member by means of a wedge- and/or thread-type drive arranged in the base member. On the other hand, the clamping element for fixing the cutter carrier in the base member may also be actuated by means of a wedge- and/or thread-type drive arranged in the base member. The wedge- and/or thread-type drive may in both cases comprise a screw or a differential screw which engages with a threaded part in an internal thread of the base member and acts with a wedge, cone or some other threaded part against the adjusting member or the clamping element.

According to a first configurational variant, the screw has a cone tip lying against the adjusting member.

A second configurational variant provides that the differential screw carries a threaded sleeve, which has a wedge surface lying against the adjusting member. The adjusting member may in this case be displaceable against the force of at least one restoring spring.

A third configurational variant provides that the differential screw engages with its one threaded part in an internal thread of the adjusting member or the clamping element and with its other threaded part in an internal thread of the base member.

The tools according to the invention, which are loaded with radially adjustable tangential indexable inserts, may, for example, be modified for the fine machining of internal bores or for finishing during milling work.

BRIEF DESCRIPTION OF THE DRAWINGS

The invention is explained in more detail below on the basis of several exemplary embodiments schematically represented in the drawing, in which:

FIG. 2g shows the spring-assisted adjusting member with a wedge-shaped bottom supporting surface of the adjusting mechanism as shown in FIG. 2a;

FIG. 2h shows an adjusting screw with a cone tip for adjusting the adjusting member as shown in FIG. 2g in a diagrammatic representation;

FIG. 3g shows the spring-assisted adjusting member with a wedge-shaped bottom supporting surface of the adjusting variant as shown in FIG. 3a;

FIG. 3h shows a threaded sleeve with a wedge surface lying against the adjusting member as shown in FIG. 3g;

FIG. 4g shows an adjusting member with a wedge-shaped bottom supporting surface of the adjusting variant as shown in FIG. 4a;

DETAILED DESCRIPTION OF THE INVENTION

Figure 1:
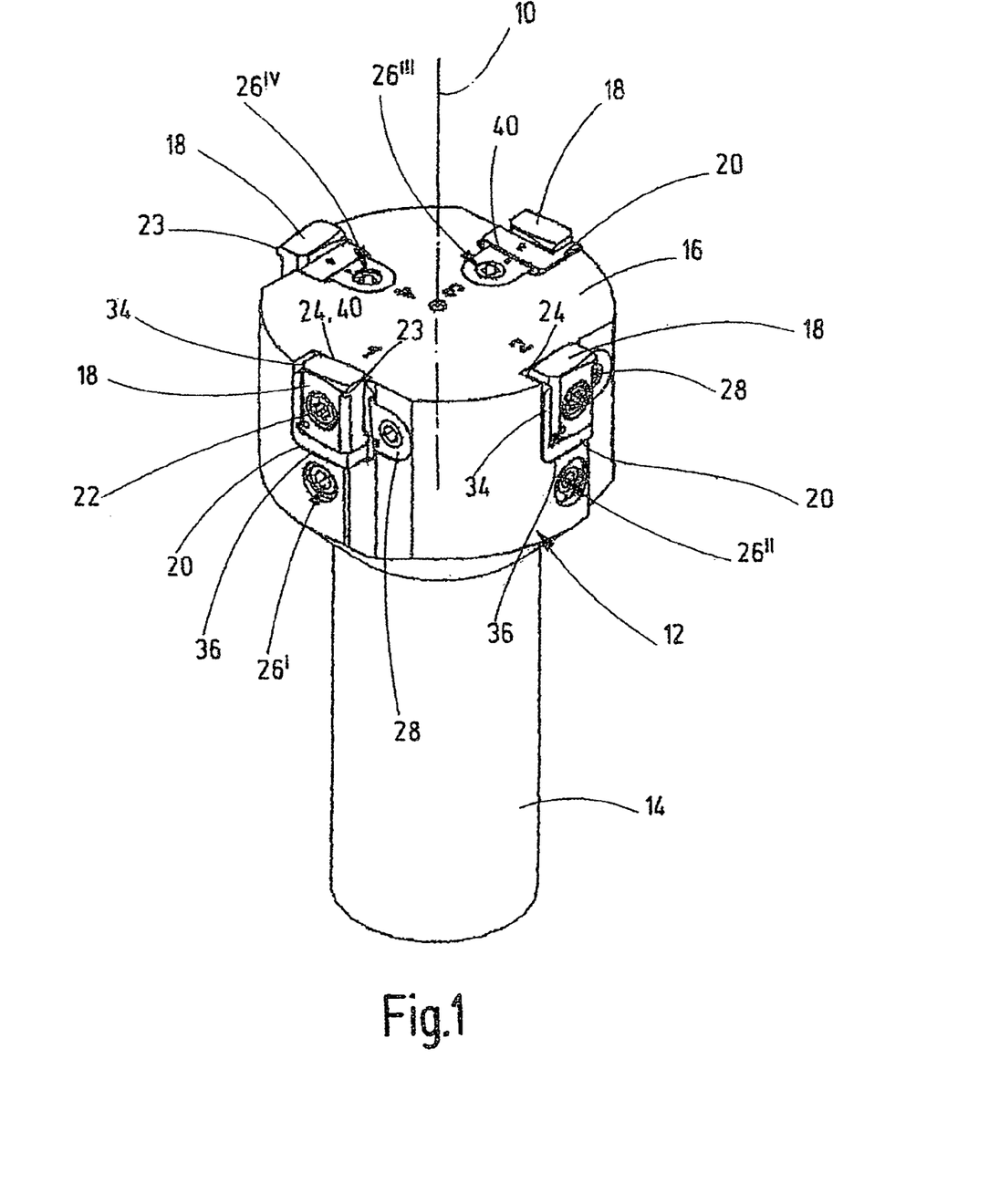
FIG. 1 shows a fine drilling tool with four indexable inserts which are arranged such that they are distributed over the circumference, aligned tangentially and each have an adjusting mechanism for radial adjustment.
Figure 2A:
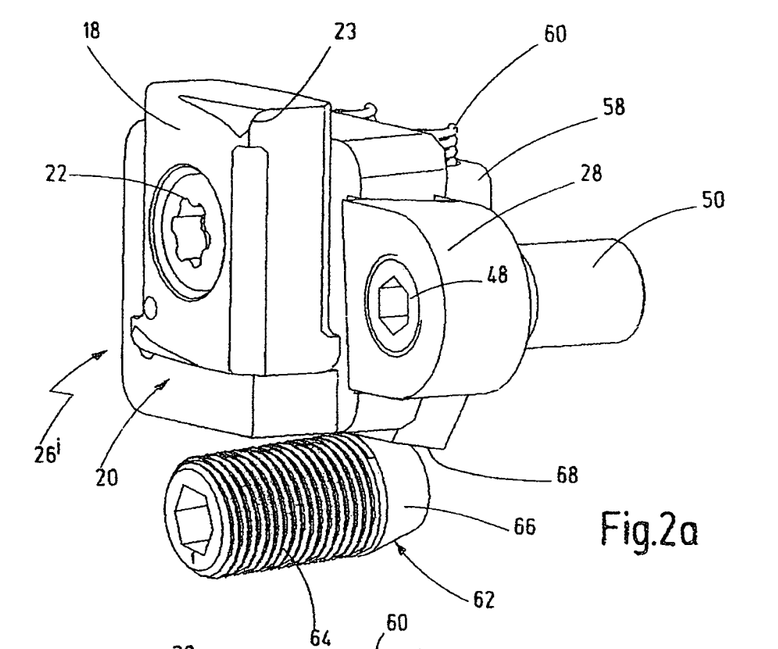
FIGS. 2a and b show a first configurational variant of an adjusting mechanism for the tool as shown in FIG. 1 in the assembled state and in an exploded representation, in each case in a diagrammatic representation.
Figure 2B:
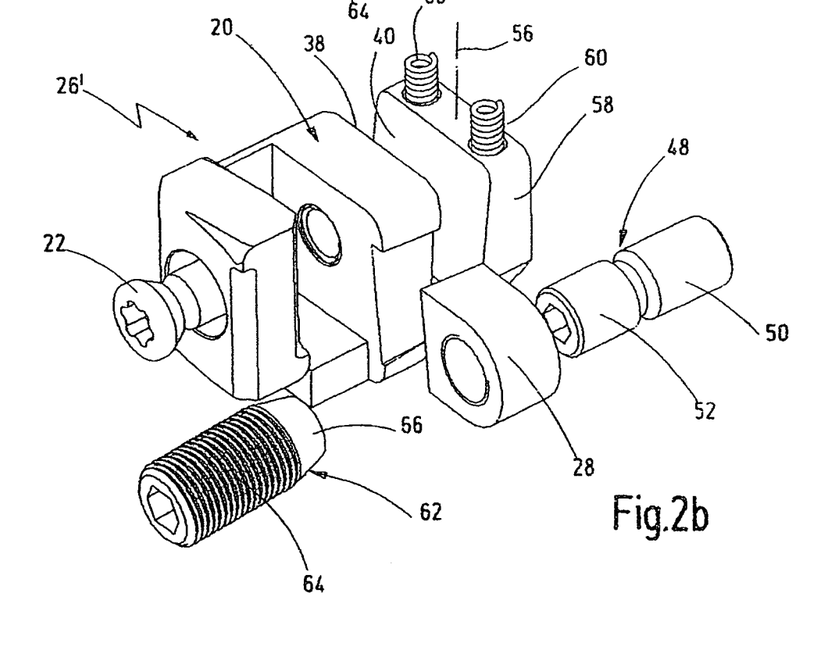
Figure 2C:
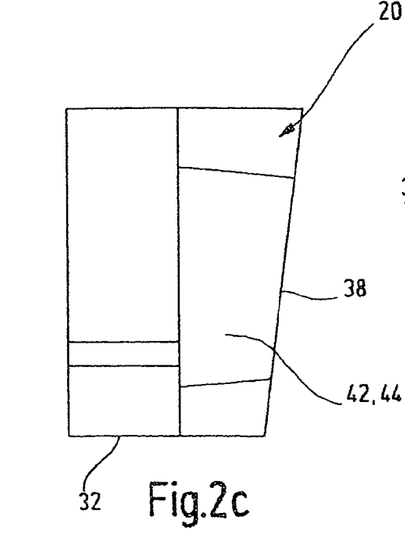
FIGS. 2c to f show a side view and a plan view of a cutting insert carrier as shown in FIG. 2a as well as a respective diagrammatic representation of the cutting insert carrier without and with a cutting insert.
Figure 2D:
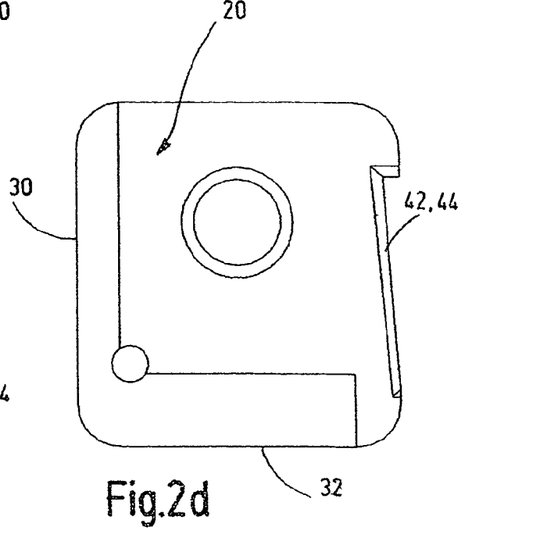
Figure 2E:
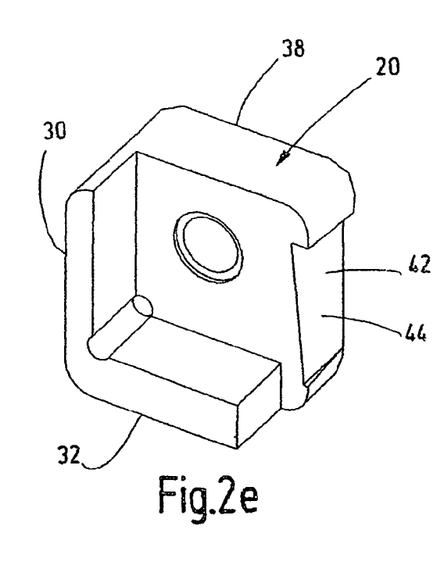
Figure 2F:
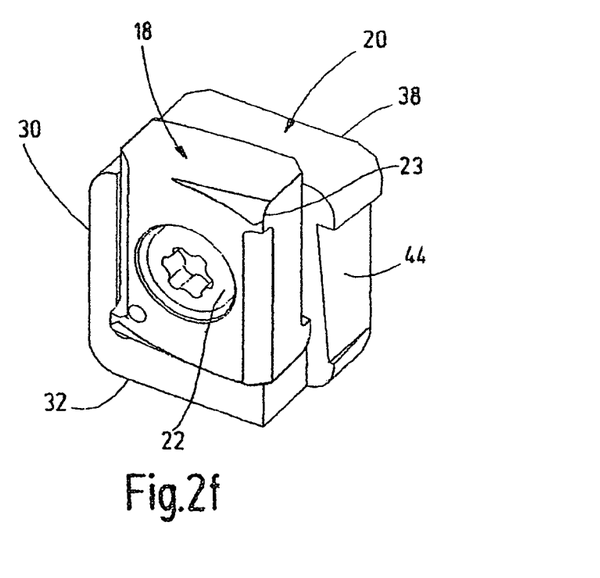
Figures 2G, 2H, 3G, 3H, 4G:
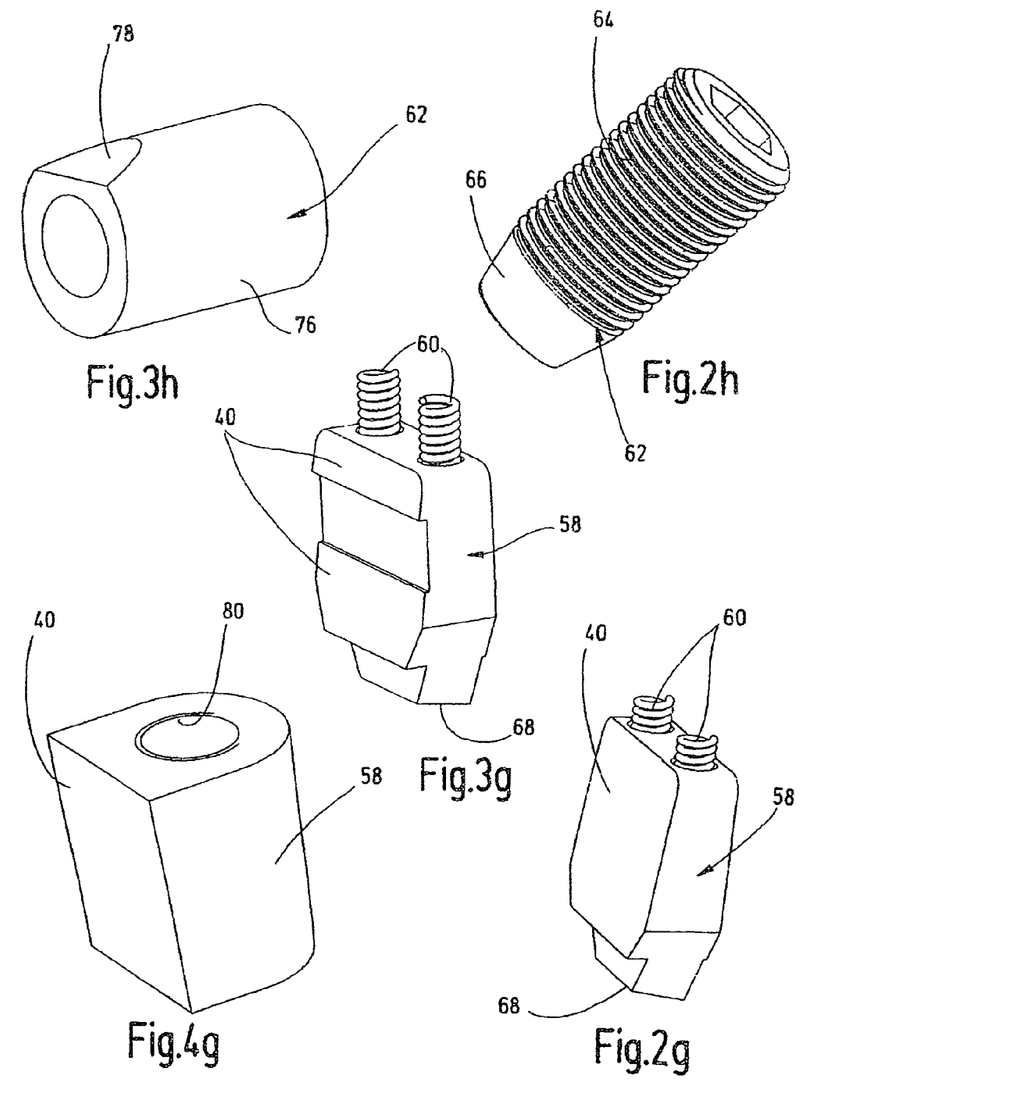
Figure 2I:
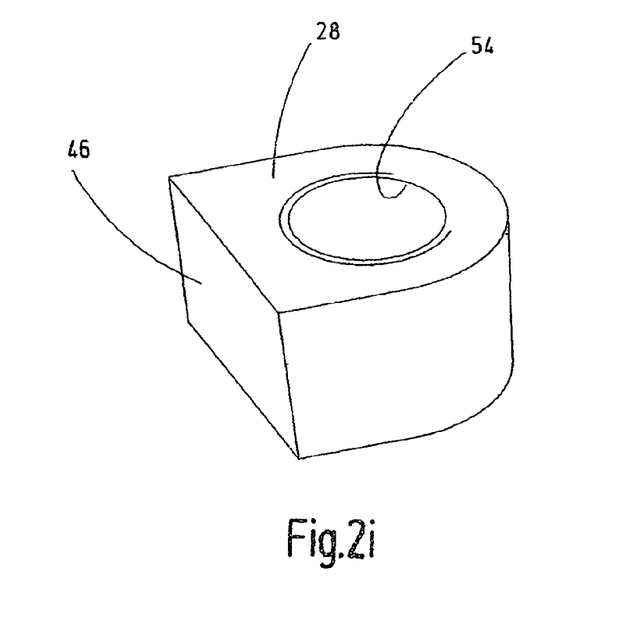
FIG. 2i shows a diagrammatic representation of the clamping element for clamping the cutting carrier as shown in FIGS. 2a, 3a, 4a and 5a in the base member pocket.
Figure 2J:
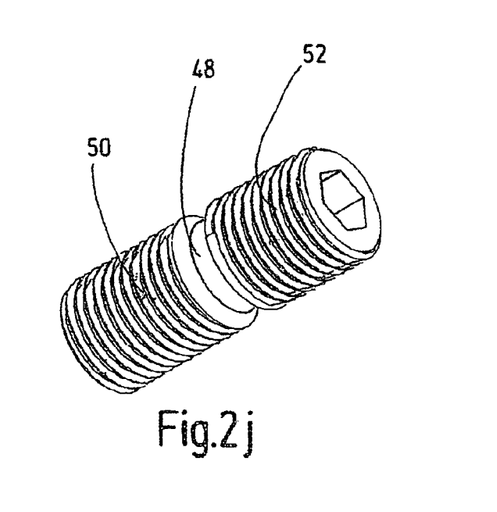
FIG. 2j shows a differential screw for adjusting the clamping element as shown in FIG. 2i.

The rotating tool represented in FIG. 1 is intended for use in machine tools. It is formed as a four-fluted core drill, the axis of rotation of which is denoted by 10. The base member 12 of the machine tool has a shank 14 for connection to a machine spindle and a tool head 16 with four cutting inserts 18 arranged such that they are distributed around the circumference. The cutting inserts 18 are arranged in tangential alignment on the cartridge-like cutter carriers 20 and fixed there by means of clamping screws 22. They protrude with an effective cutting edge 23 in the outward direction beyond the cutter carrier 20 and the base member 12. The cutter carriers 20 each engage in a pocket 24 of the base member 12 and are adjustable there in the radial direction by means of an adjusting mechanism 26', 26'', 26''', $26^{IV}$ and can be fixed in the chosen setting by means of a clamping element 28.

For the adjustment of the cutting inserts 18 of the machine tool as shown in FIG. 1, four different variants of an adjusting mechanism 26', 26'', 26''', $26^{IV}$ are proposed, represented symbolically in FIG. 1 and more precisely in their details in FIGS. 2, 3, 4 and 5.

In the case of all four configurational variants, the cutter carriers 20 have in each case two side surfaces 30, 32, which enclose a right angle with one another and with which they lie against a respective side supporting surface 34, 36 within the pocket 24. Furthermore, the cutter carriers are supported with their bottom 38 against a bottom supporting surface 40. On a third side surface 42, the cutter carriers 20 form a wedge surface 44, which encloses a respective angle with the two side surfaces 30, 32 lying against the side supporting surfaces 34, 36 and with the bottom 38 and against which there lies a complementing wedge of the clamping element 28 that can be displaced in relation to the base member while exerting a clamping force with force components extending in the direction of the two side supporting surfaces 34, 36 and the bottom supporting surface 40. In the case of all the configurational variants, the actuation of the clamping element 28 is performed with the aid of a differential screw 48, the one threaded part 50 of which engages in an internal thread of the base member 12 and the other threaded part 52 of which, with a different thread pitch, engages in an internal thread 54 of the clamping element 28. The wedge surfaces 46, 44 on the clamping element 28 and on the side surface 42 of the cutter carrier are aligned parallel with one another such that adjustment of the differential screw 48 has the effect that the cutter carrier 20 is clamped in the pocket 24. For the actuation of the adjusting mechanism 26' to $26^{IV}$, the clamping element 28 must first be released from its clamping position by actuation of the differential screw 48.

The radial adjustment of the cutter carrier 20 and of the indexable cutting insert 18 connected to it takes place in all the adjusting variants by way of the bottom supporting surface 40. For this purpose, the bottom supporting surface 40 forms a wedge surface, which is arranged on an adjusting member 58 that is displaceable with respect to the base member 12 along an axis of displacement 56 and encloses an acute angle with the axis of displacement and against which the cutting insert 20 lies with its bottom 38 formed as a complementing wedge. The two side supporting surfaces 30, 32 at the same time form guiding surfaces for the cutter carrier 20, aligned substantially perpendicularly in relation to the axis of displacement 56 of the adjusting member 58 when said cutter carrier undergoes an adjusting operation by displacement of the adjusting member 58.

In the case of configurational variants 1 and 2 of the adjusting mechanism 26', 26" (FIGS. 2 and 3), the adjustment of the adjusting member 58 in the direction of the axis of displacement 56 takes place against the force of the compression springs 60 with the aid of a radially actuable wedge- and thread-type drive 62. In the case of configurational variant 1 (adjusting mechanism 26'), the wedge- and thread-type drive is formed as a screw 64 with a cone tip 66 engaging in an internal thread of the base member (FIGS. 2a, b and h), the cone tip 66 of which lies against a wedge surface 68 of the adjusting member 58. The wedge surface 68 is arranged on the side of the adjusting member 58 opposite from the compression springs 60. The displacing movement of the adjusting member 58 is transformed by way of the bottom supporting surface 40, formed as a wedge surface, into a displacing movement of the cutter carrier 20 directed radially with respect to the base member 18. After reaching the desired cutting circle diameter of the associated cutting insert 18, the clamping element 28 is displaced by way of the wedge- and thread-type drive 62 against the side surface 42 of the cutter carrier 20, whereby the cutter carrier 20 is firmly clamped in the pocket 24 such that no further actuation of the wedge- and thread-type drive 62 is possible.

Figure 3A:
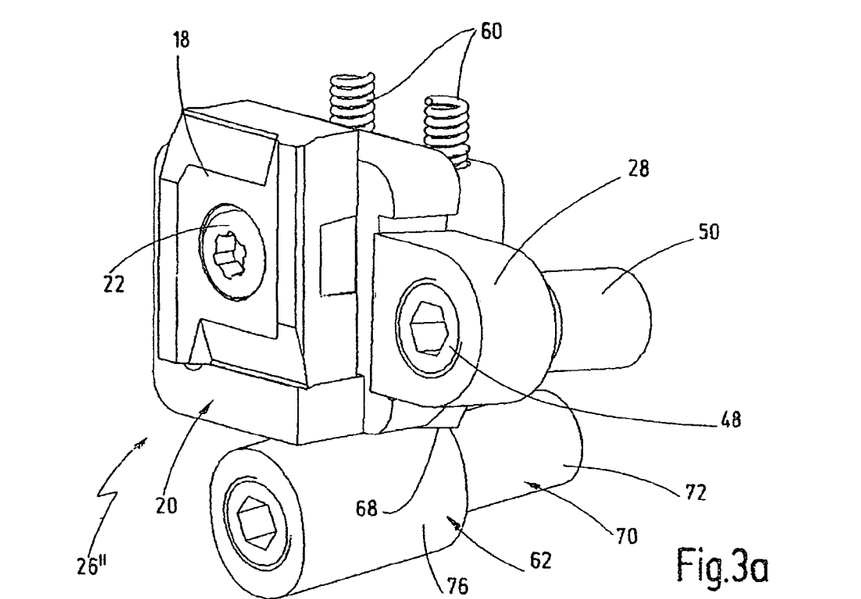
FIGS. 3a and b show a second configurational variant of an adjusting mechanism for the tool as shown in FIG. 1 in the assembled state and in an exposed representation, in each case in a diagrammatic representation.
Figure 3B:
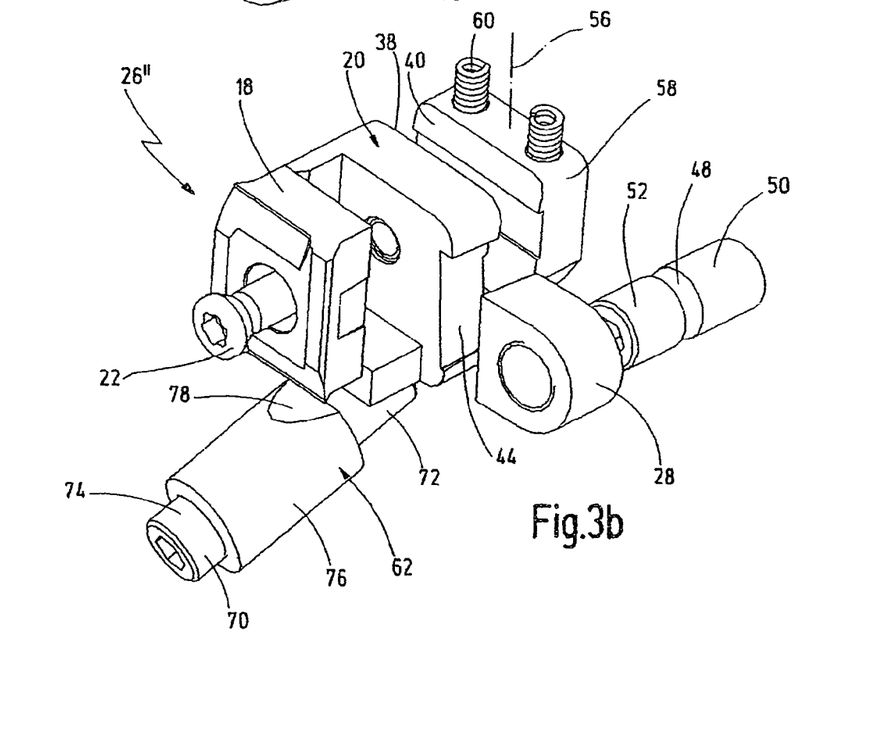
Figure 3C:
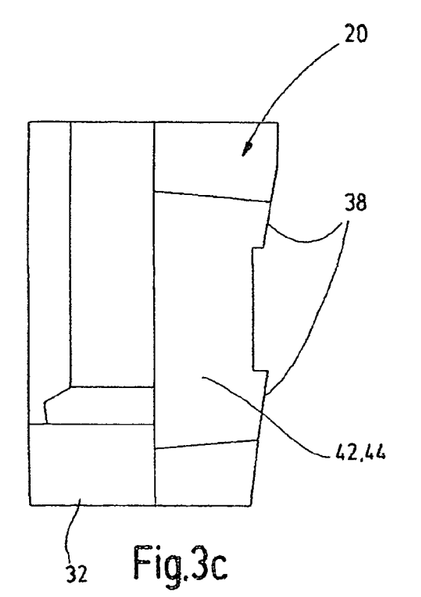
FIGS. 3c to f show a side view and a plan view of a cutting insert carrier as shown in FIG. 3a as well as a respective diagrammatic representation of the cutting insert carrier without and with a cutting insert.
Figure 3D:
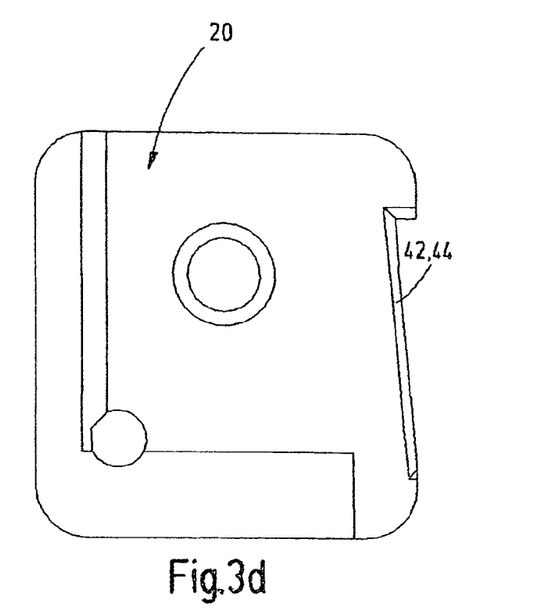
Figure 3E:
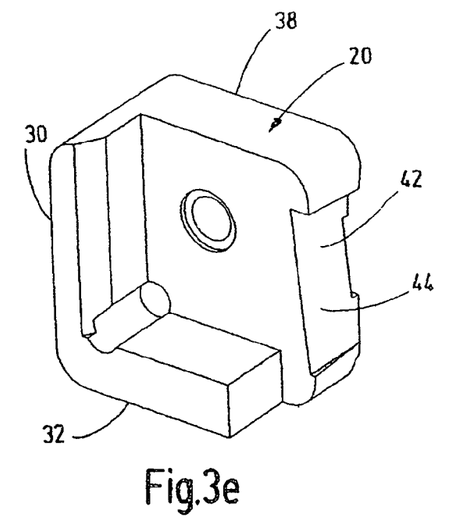
Figure 3F:
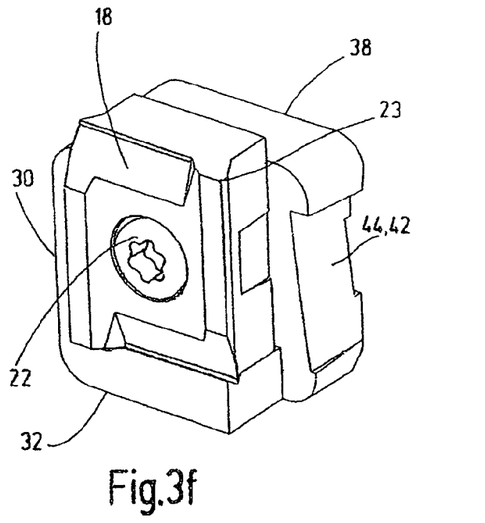
Figure 4A:
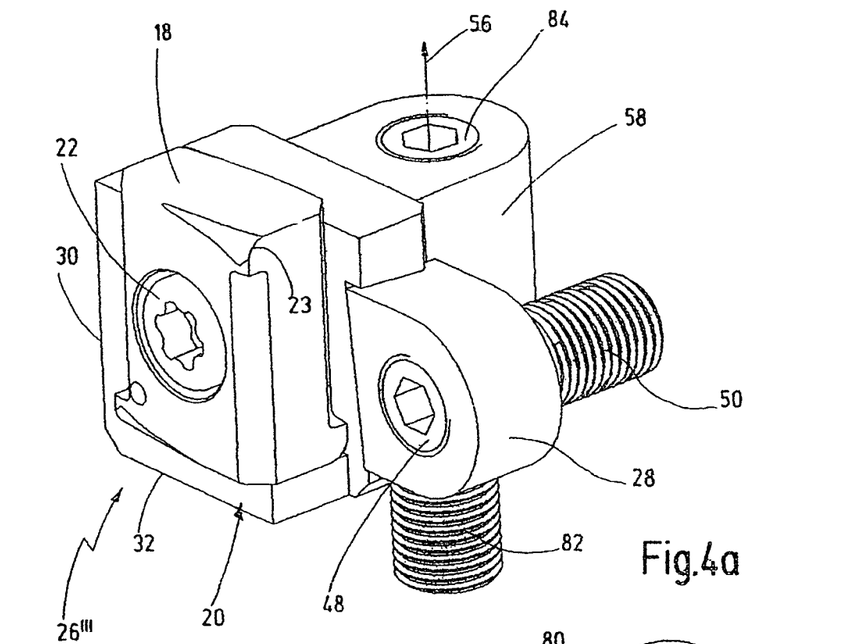
FIGS. 4a and b show a third configurational variant of an adjusting mechanism for the tool as shown in FIG. 1 in the assembled state and in an exploded representation, in each case in a diagrammatic representation.
Figure 4B:
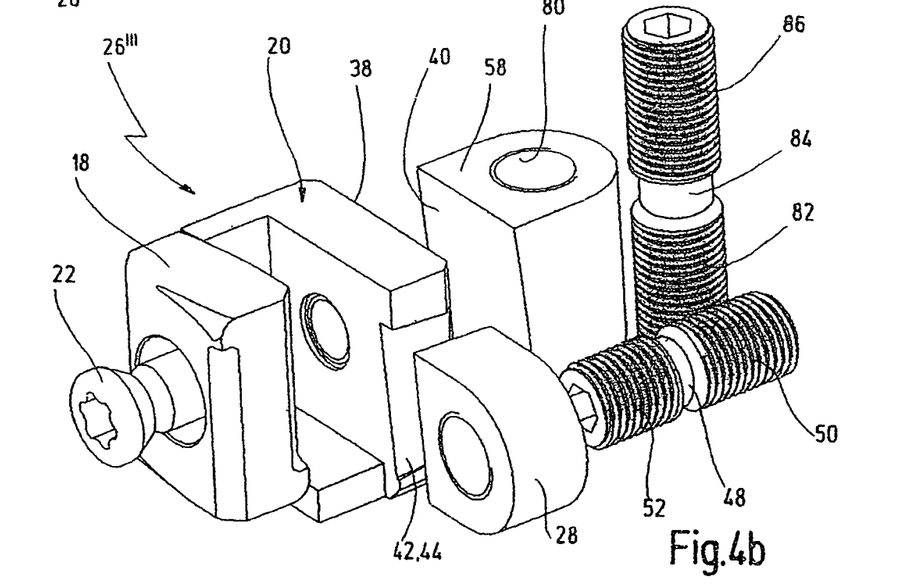
Figure 4C:
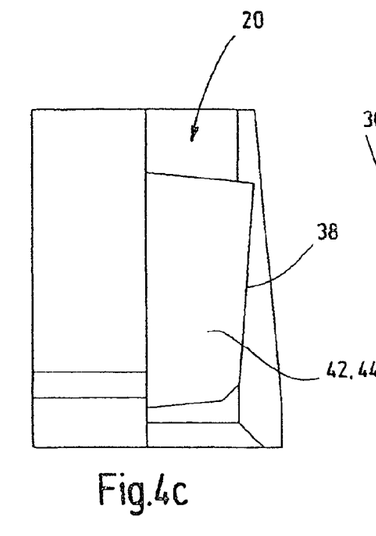
FIGS. 4c to f show a side view and a plan view of a cutting insert carrier as shown in FIG. 4a as well as a respective diagrammatic representation of the cutting insert carrier without and with a cutting insert.
Figure 4D:
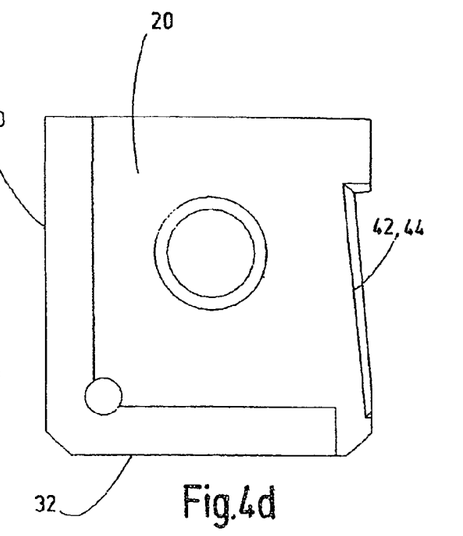
Figure 4E:
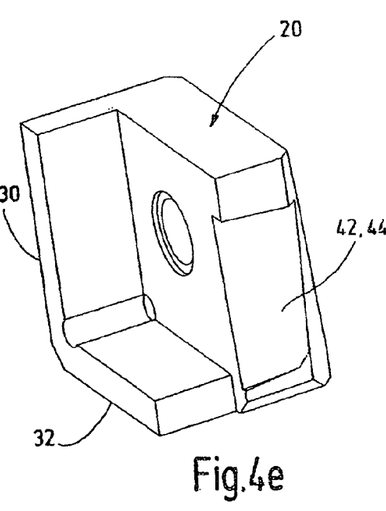
Figure 4F:
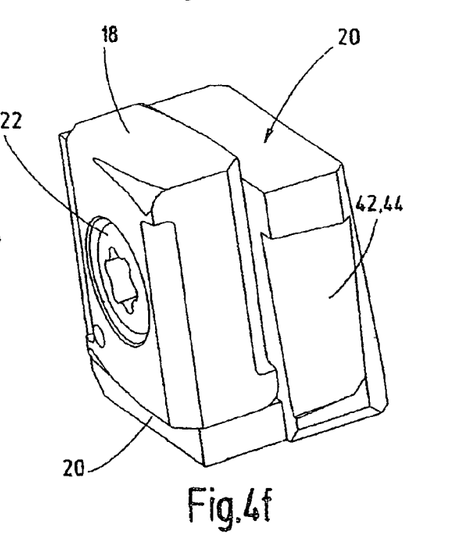
Figure 4H:
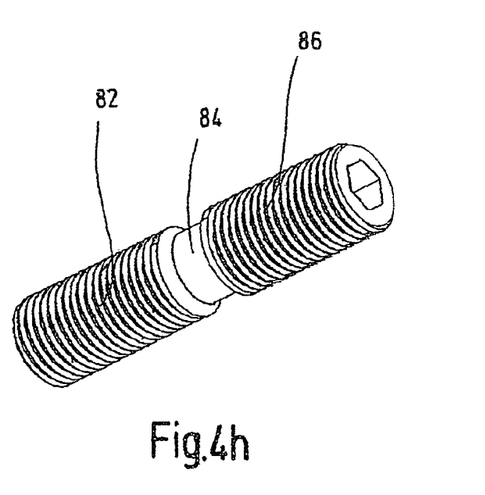
FIG. 4h shows a differential screw for adjusting the adjusting member as shown in FIG. 4g.
Figure 5A:
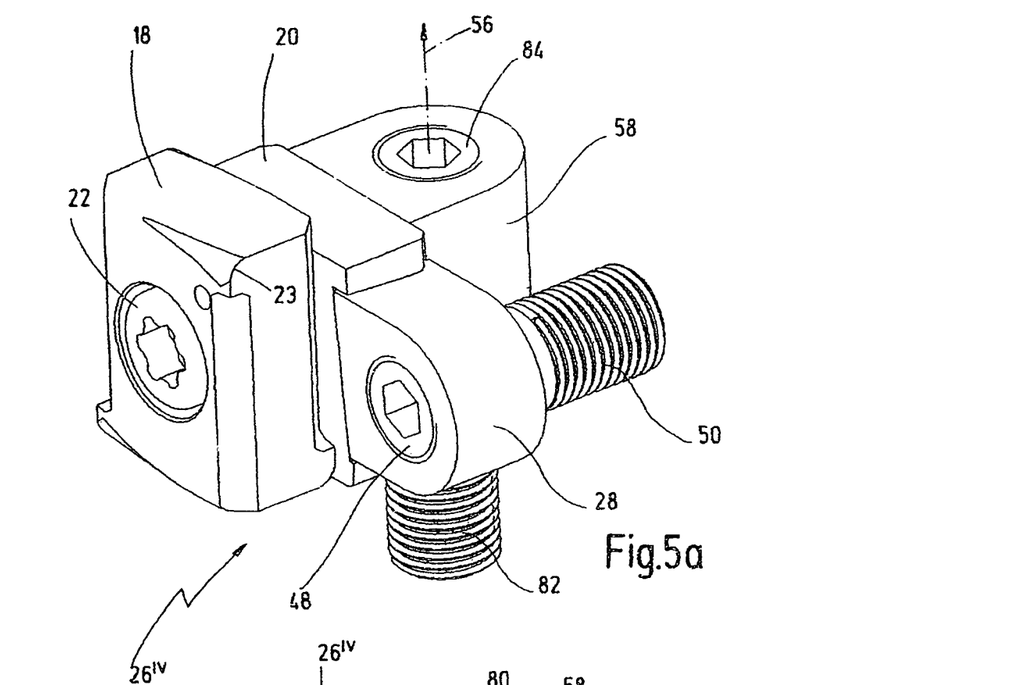
FIGS. 5a and b show a fourth configurational variant of an adjusting mechanism for the tool as shown in FIG. 1 in the assembled state and in an exploded representation, in each case in a diagrammatic representation.
Figure 5B:
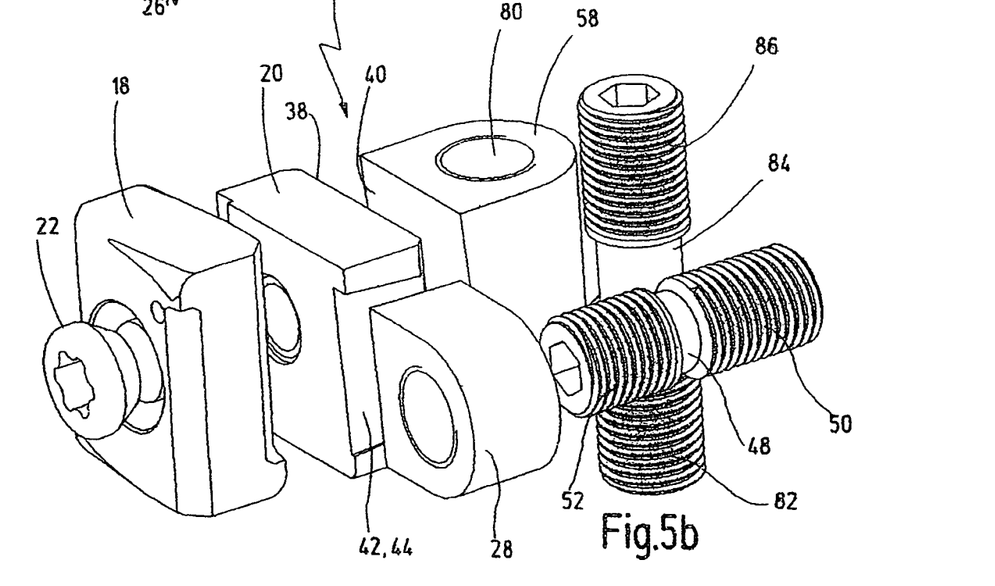
Figure 5C:
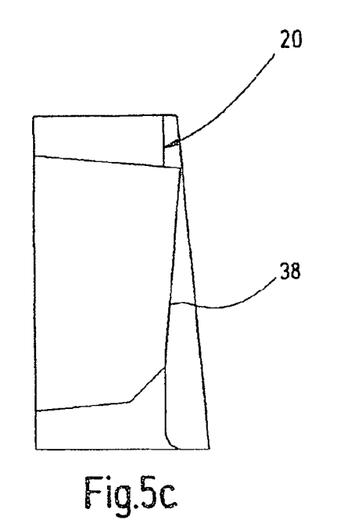
FIGS. 5c to f show a side view and a plan view of a cutting insert carrier as shown in FIG. 5 as well as a respective diagrammatic representation of the cutting insert carrier without and with a cutting insert.
Figure 5D:
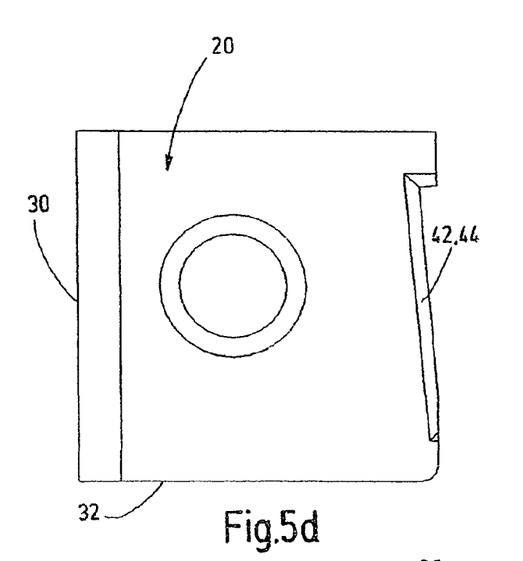
Figures 5E, 5F:
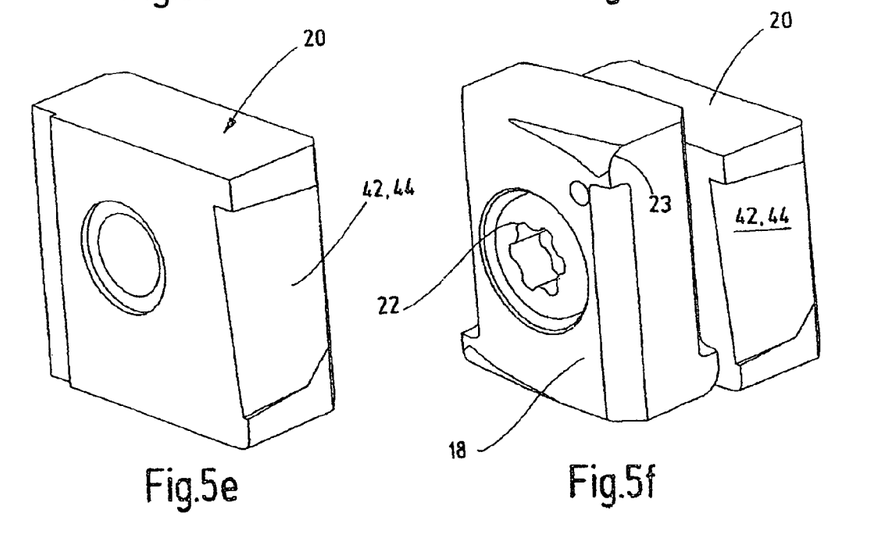

The adjusting mechanism 26" of configurational variant 2 differs from the adjusting mechanism 26' of configurational variant 1 substantially in that the wedge- and thread-type drive 62 has a differential screw 70, one threaded part 72 of which engages in an internal thread of the base member and the other threaded part 74 of which carries a threaded sleeve 76 with a formed-on wedge surface 78. The threaded sleeve 76 lies with its wedge surface 78 against the wedge surface 68 of the adjusting member 58 such that the latter can be displaced against the force of the compression springs 60 in the direction of the axis of displacement 56 by actuation of the differential screw 70. The wedge surface defined by the bottom supporting surface 40 is in this case divided in two. Similarly, the bottom 38 of the cutter carrier 20 has a complementing wedge surface that is divided in two. When the differential screw 70 is actuated, a radial adjustment of the cutter carrier 20 with its cutting insert 18 takes place in the same way as in the case of configurational variant 1. After reaching the desired cutting circle diameter, the cutter carrier 20 is fixed in the pocket 24 of the base member 12 by way of the clamping element 28.

The adjusting mechanisms 26''' and 24$^{IV}$ of configurational variants 3 and 4 as shown in FIGS. 4 and 5 differ from configurational variants 1 and 2 as shown in FIGS. 2 and 3 substantially in that the actuation of the adjusting member 58 takes place from above in the axial direction. For this purpose, the adjusting member 58 has an internal thread 80 for receiving the one threaded part 86 of a differential screw 84, the second threaded part 82 of which engages in an internal thread of the base member 12. The thread pitches of the two threaded parts 82, 86 are chosen in this case such that the adjusting member 58 is displaced in the direction of the axis of displacement 56 with a predetermined step-down transmission in one direction or the other. No additional compression springs 60 are needed here. The displacement of the adjusting member 58 is transformed into a radial displacement of the cutter carrier 20 carrying the cutting insert 18.

Configurational variant 3 (FIG. 4) and configurational variant 4 (FIG. 5) differ only in the formation of the cutter carrier 20, which in the case of configurational variant 3 is provided in the manner of a cartridge with two side walls for supporting the cutting insert 18 (FIGS. 4c-f), while in the case of configurational variant 4 the cutter carrier 20 is formed as a cuboid without walls (FIGS. 5c-f). In the latter case, the supporting of the cutting insert 18 together with the cutter carrier 20 takes place on the side supporting surfaces 34, 36 of the pocket 24 of the base member 12.

Figure 6A:
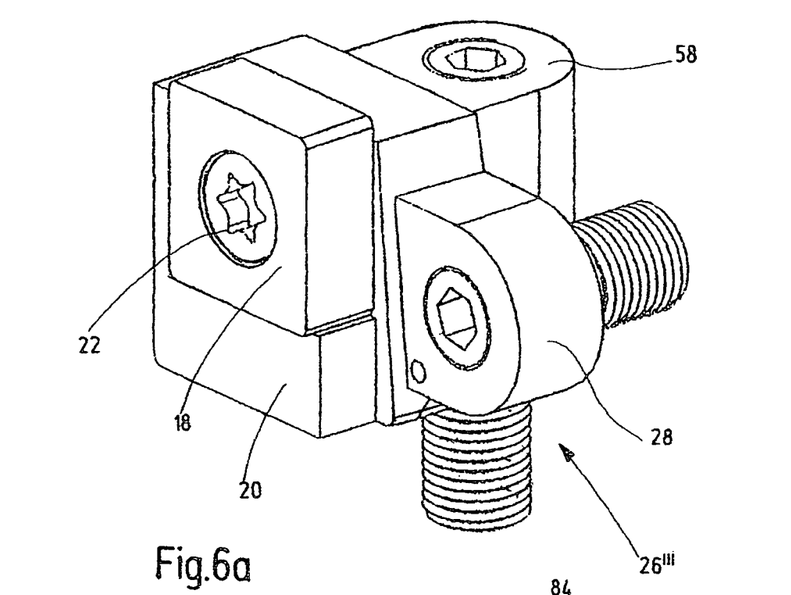
FIGS. 6a and b show a respective diagrammatic representation of the adjusting system as shown in FIG. 4a with exchangeable cutter carriers for a square indexable cutting insert and a rhombic indexable cutting insert.
Figure 6B:
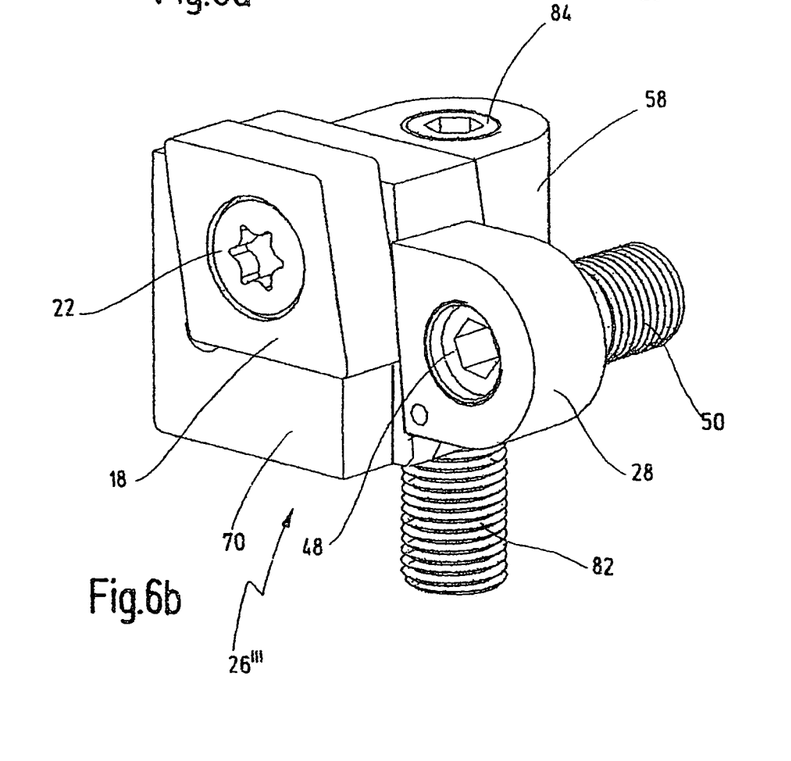

In FIGS. 6a and b, it can be seen for the case of configurational variant 3 that cutter carriers 20 for different forms of cutting insert (for example with a square or rhombic outline), and consequently for different applications, can be used in one and the same machine tool.

To sum up, the following can be stated: the invention relates to a machine tool with an adjustable cutting insert. The rotating machine tool substantially comprises a base member 12 having an axis of rotation 10, at least one pocket 24 formed in the base member 12 and at least one cutter carrier 20 carrying a cutting insert 18. The cutter carrier 20 lies with two side surfaces 30, 32, enclosing an angle with one another, against a respective side supporting surface 34, 36 and with its bottom 38 against a bottom supporting surface 40 of the pocket 24 and is releasably clamped in the pocket 24 by a clamping element 28. The cutting insert 18 protrudes with an effective cutting edge 23 in the outward direction beyond the cutter carrier 20 and the base member 12. To make a fine adjustment possible even for tangential cutting inserts in the base member, it is proposed according to the invention that the bottom supporting surface 40 forms a wedge surface, which is arranged on an adjusting member 58 that is displaceable with respect to the base member 12 along an axis of displacement 56 and encloses an acute angle with the axis of displacement and against which the cutter carrier 20 lies with its bottom 38 formed as a complementing wedge. Furthermore, the two side supporting surfaces 34, 36 form guiding surfaces for the cutter carrier 20, aligned substantially perpendicularly in relation to the axis of displacement 56 of the adjusting member 58, when said cutter carrier undergoes an adjusting operation by displacement of the adjusting member 58.

The invention claimed is:

1. A machine tool with a base member (12), with at least one pocket (24) formed in the base member (12) and with at least one cutter carrier (20) carrying a cutting insert (18), wherein the cutter carrier (20) lies with two side surfaces (30, 32), enclosing an angle with one another, against a respective side supporting surface (34, 36) and with its bottom (38) against a bottom supporting surface (40) of the pocket and is releasably clamped in the pocket (24) by a clamping element (28), and wherein the cutting insert (18) protrudes with an effective cutting edge (23) in the outward direction beyond the cutter carrier (20) and the base member (12), wherein the bottom supporting surface (40) forms a wedge surface, which is arranged on an adjusting member (58) that is displaceable with respect to the base member (12) along an axis of displacement (56) and encloses an acute angle with the axis of displacement (56) and against which the cutter carrier (20) lies with its bottom (38) formed as a complementing wedge, and wherein the two side supporting surfaces (34, 36) form guiding surfaces for the cutter carrier (20), aligned substantially perpendicularly in relation to the axis of displacement (56) of the adjusting member (58), during a displacing operation performed by displacement of the adjusting member (58), characterized in that, on a third side surface (42), the cutter carrier (20) forms a wedge surface (44), which encloses a respective angle with the two side surfaces (30, 32) lying against the side supporting surfaces (34, 36) and with the bottom (38) and against which there lies a complementing wedge (46) of the clamping element (28) that can be displaced in relation to the base member (12) by an adjusting member (48) while exerting a clamping force extending in the direction of the two side supporting surfaces (34, 36) and the bottom supporting surface (40) and the axis of displacement (56) of the adjusting member (58) is aligned parallel to an axis of rotation (10) of the base member (12).

2. The machine tool as claimed in claim 1, characterized in that the cutting insert (18) is rigidly connected to the cutter carrier (20) by means of a clamping element, in particular by means of a clamping screw (22).

3. The machine tool as claimed in claim 1, characterized in that the cutter carrier (20) is formed as a cartridge.

4. The machine tool as claimed in claim 1, characterized in that the adjusting member (58) can be displaced in relation to the base member (12) by means of a wedge- and/or thread-type drive (62) arranged in the base member (12).

5. The machine tool as claimed in claim 1, characterized in that the clamping element (28) can be actuated by means of a wedge- and/or thread-type drive (48) arranged in the base member (18).

6. The machine tool as claimed in claim 4, characterized in that the wedge- and/or thread-type drive (62, 48) comprises a screw (64) or differential screw (70, 84), which engages with a threaded part (72) in an internal thread of the base member (12) and acts with a wedge (78), a cone (66) or a further threaded part (74) against the adjusting member (58) or the clamping element (28).

7. The machine tool as claimed in claim 6, characterized in that the differential screw (70, 84) engages with its one threaded part (86, 52) in an internal thread (80, 54) of the adjusting member (58) or the clamping member (28) and with its other threaded part (82, 50) in an internal thread of the base member (12).

8. The machine tool as claimed in claim 1, characterized in that the cutter carrier (20) has an insert seat for a cutting insert (18) formed as an indexable insert.

9. The machine tool as claimed in claim 1, characterized by a group of at least two cutter carriers (20) which can be exchanged for one another on the base member (12) and have insert seats for different geometries of cutting insert.

10. A machine tool with a base member (12), with at least one pocket (24) formed in the base member (12) and with at least one cutter carrier (20) carrying a cutting insert (18), wherein the cutter carrier (20) lies with two side surfaces (30, 32), enclosing an angle with one another, against a respective side supporting surface (34, 36) and with its bottom (38) against a bottom supporting surface (40) of the pocket and is releasably clamped in the pocket (24) by a clamping element (28), and wherein the cutting insert (18) protrudes with an effective cutting edge (23) in the outward direction beyond the cutter carrier (20) and the base member (12), wherein the bottom supporting surface (40) forms a wedge surface, which is arranged on an adjusting member (58) that is displaceable with respect to the base member (12) along an axis of displacement (56) and encloses an acute angle with the axis of displacement (56) and against which the cutter carrier (20) lies with its bottom (38) formed as a complementing wedge, and wherein the two side supporting surfaces (34, 36) form guiding surfaces for the cutter carrier (20), aligned substantially perpendicularly in relation to the axis of displacement (56) of the adjusting member (58), during a displacing operation performed by displacement of the adjusting member (58), characterized in that, on a third side surface (42), the cutter carrier (20) forms a wedge surface (44), which encloses a respective angle with the two side surfaces (30, 32) lying against the side supporting surfaces (34, 36) and with the bottom (38) and against which there lies a complementing wedge (46) of the clamping element (28) that can be displaced in relation to the base member (12) by an adjusting member (48) while exerting a clamping force extending in the direction of the two side supporting surfaces (34, 36) and the bottom supporting surface (40) and the axis of displacement (56) of the adjusting member (58) is aligned parallel to an axis of rotation (10) of the base member (12), the adjusting member (58) can be displaced in relation to the base member (12) by means of a wedge- and/or thread-type drive (62) arranged in the base member (12), the wedge- and/or thread-type drive (62, 48) comprises a screw (64) or differential screw (70, 84), which engages with a threaded part (72) in an internal thread of the base member (12) and acts with a wedge (78), a cone (66) or a further threaded part (74) against the adjusting member (58) or the clamping element (28) and the screw (64) has a cone tip (66) lying against the adjusting member (58).

11. A machine tool with a base member (12), with at least one pocket (24) formed in the base member (12) and with at least one cutter carrier (20) carrying a cutting insert (18), wherein the cutter carrier (20) lies with two side surfaces (30, 32), enclosing an angle with one another, against a respective side supporting surface (34, 36) and with its bottom (38) against a bottom supporting surface (40) of the pocket and is releasably clamped in the pocket (24) by a clamping element (28), and wherein the cutting insert (18) protrudes with an effective cutting edge (23) in the outward direction beyond the cutter carrier (20) and the base member (12), wherein the bottom supporting surface (40) forms a wedge surface, which is arranged on an adjusting member (58) that is displaceable with respect to the base member (12) along an axis of displacement (56) and encloses an acute angle with the axis of displacement (56) and against which the cutter carrier (20) lies with its bottom (38) formed as a complementing wedge, and wherein the two side supporting surfaces (34, 36) form guiding surfaces for the cutter carrier (20), aligned substantially perpendicularly in relation to the axis of displacement (56) of the adjusting member (58), during a displacing operation performed by displacement of the adjusting member (58), characterized in that, on a third side surface (42), the cutter carrier (20) forms a wedge surface (44), which encloses a respective angle with the two side surfaces (30, 32) lying against the side supporting surfaces (34, 36) and with the bottom (38) and against which there lies a complementing wedge (46) of the clamping element (28) that can be displaced in relation to the base member (12) by an adjusting member (48) while exerting a clamping force extending in the direction of the two side supporting surfaces (34, 36) and the bottom supporting surface (40), the wedge- and/or thread-type drive (62, 48) comprises a screw (64) or differential screw (70, 84), which engages with a threaded part (72) in an internal thread of the base member (12) and acts with a wedge (78), a cone (66) or a further threaded part (74) against the adjusting member (58) or the clamping element (28) and the differential screw (70) carries a threaded sleeve (76), which has a wedge surface (38) lying against the adjusting member (58).

12. A machine tool with a base member (12), with at least one pocket (24) formed in the base member (12) and with at least one cutter carrier (20) carrying a cutting insert (18), wherein the cutter carrier (20) lies with two side surfaces (30, 32), enclosing an angle with one another, against a respective side supporting surface (34, 36) and with its bottom (38) against a bottom supporting surface (40) of the pocket and is releasably clamped in the pocket (24) by a clamping element (28), and wherein the cutting insert (18) protrudes with an effective cutting edge (23) in the outward direction beyond the cutter carrier (20) and the base member (12), wherein the bottom supporting surface (40) forms a wedge surface, which is arranged on an adjusting member (58) that is displaceable with respect to the base member (12) along an axis of displacement (56) and encloses an acute angle with the axis of displacement (56) and against which the cutter carrier (20) lies with its bottom (38) formed as a complementing wedge, and wherein the two side supporting surfaces (34, 36) form guiding surfaces for the cutter carrier (20), aligned substantially perpendicularly in relation to the axis of displacement (56) of the adjusting member (58), during a displacing operation performed by displacement of the adjusting member (58), characterized in that, on a third side surface (42), the cutter carrier (20) forms a wedge surface (44), which encloses a respective angle with the two side surfaces (30, 32) lying against the side supporting surfaces (34, 36) and with the bottom (38) and against which there lies a complementing wedge (46) of the clamping element (28) that can be displaced in relation to the base member (12) by an adjusting member (48) while exerting a clamping force extending in the direction of the two side supporting surfaces (34, 36) and the bottom supporting surface (40) and the adjusting member (58) is displaceable against the force of at least one restoring spring (60).

\* \* \* \* \*